(12) United States Patent
Esquivia-Lee et al.

(10) Patent No.: US 7,474,747 B2
(45) Date of Patent: Jan. 6, 2009

(54) ELECTRONIC COMMUNICATION DEVICE INCLUDING AUDIO CHANNELING

(75) Inventors: Carlos M. Esquivia-Lee, Plantation, FL (US); Donald W. Burnette, Sunrise, FL (US); Kevin S. Olcott, Parkland, FL (US)

(73) Assignee: Motorola, Inc., Schaumburg, IL (US)

( * ) Notice: Subject to any disclaimer, the term of this patent is extended or adjusted under 35 U.S.C. 154(b) by 387 days.

(21) Appl. No.: 10/743,481

(22) Filed: Dec. 22, 2003

(65) Prior Publication Data
US 2005/0136883 A1 Jun. 23, 2005

(51) Int. Cl.
*H04M 1/00* (2006.01)
*H04M 9/00* (2006.01)
(52) U.S. Cl. .............................. 379/433.02; 379/433.01
(58) Field of Classification Search ............ 379/433.01, 379/433.02, 433.04, 433.11, 434; 455/566, 455/575.1, 575.8
See application file for complete search history.

(56) References Cited

U.S. PATENT DOCUMENTS

| | | | | |
|---|---|---|---|---|
| 5,982,881 A * | 11/1999 | Mischenko | ............ | 379/433.11 |
| 6,263,070 B1 * | 7/2001 | Kubo et al. | .................. | 379/368 |
| 6,347,218 B1 * | 2/2002 | Fuhrmann et al. | ........... | 455/90.1 |
| 6,360,110 B1 * | 3/2002 | Schmidt | ..................... | 455/564 |
| 6,438,227 B1 * | 8/2002 | Kretsch | ................. | 379/433.02 |
| 6,631,191 B1 * | 10/2003 | Holmberg | .............. | 379/433.02 |
| 6,978,123 B2 * | 12/2005 | Fuhrmann et al. | .......... | 455/90.3 |
| 2001/0024947 A1 * | 9/2001 | Fuhrmann et al. | ............. | 455/90 |
| 2002/0154765 A1 * | 10/2002 | Suzuki et al. | .......... | 379/433.01 |

* cited by examiner

*Primary Examiner*—Curtis Kuntz
*Assistant Examiner*—Phylesha Dabney

(57) ABSTRACT

A housing portion (10) for a wireless communication device is provided that has the surface area on its exterior surface (14) maximized in size for receipt of graphics by being substantially free of audio channeling thereon. Instead, the audio channels are provided in the internal space of the phone as at least partially defined by the housing portion (10), and preferably along an interior surface (16) thereof. In a preferred form, a separate audio cover member (12) is attached to the interior surface (16) to form the audio channels therebetween. The audio cover member (12) can include recesses (34) and (36) for forming the internal audio channeling provided by the assembly (38) of the housing portion (10) and the audio cover member (12).

21 Claims, 7 Drawing Sheets

FIG. 2 —PRIOR ART—

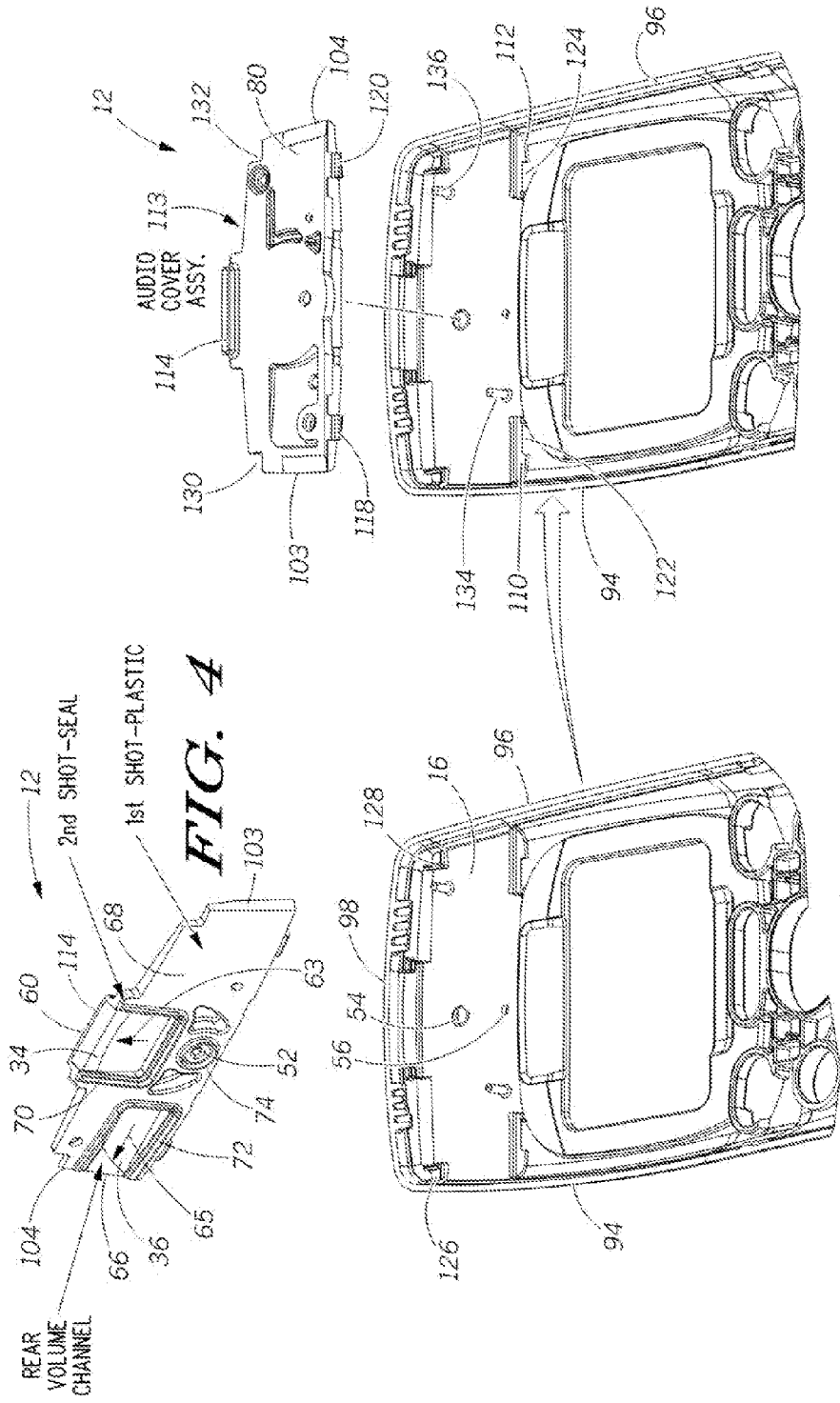

ELECTRONIC COMMUNICATION DEVICE INCLUDING AUDIO CHANNELING

FIELD OF THE INVENTION

The invention relates to electronic communication devices and, more particularly, to electronic communication devices having audio channeling for sound emitted from a speaker thereof.

BACKGROUND OF THE INVENTION

Currently, applicants' assignee herein provides a commercial phone having both high and low audio speakers, i.e. a push-to-talk (PTT) wireless telephone. The low audio speaker is a transducer toward the upper end of the phone and has industry specifications that the phone has to meet for the maximum sound or audio level emitted therefrom to the user's ear. To this end, the current PTT phone employs audio channeling for releasing excessive sound pressure emitted from the transducer to the surrounding environment to meet the specifications for the maximum audio level for the transducer.

In the current PTT design, there is a front bezel member or housing portion that is secured in place on the main body or brick of the phone that includes the RF communication circuitry, display screen, speakers and key pad for the phone. The brick also has the rear housing portion affixed thereto so that with the bezel housing portion secured in place, the housing portions cooperate to enclose the brick and its associated components and together form the external surface of the phone. The front bezel housing portion includes a window opening that is aligned with the display screen of the phone, and includes audio ports thereabove in general alignment with the phone transducer. The audio channeling is formed on the external surface of the bezel as by recesses therein about the audio ports in cooperation with a transparent lens member attached to the bezel member along the external surface thereof. Accordingly, the lens member is sized not only to cover the window opening in the bezel but also to extend thereabove and substantially to the upper end of the bezel to cover the bezel recesses for forming the audio channels for the phone. In other words, the current PTT phone design requires that the lens member be sized sufficiently large to cover not only the window opening but also the recesses in the external surface of the bezel above the window opening.

One problem with the current PTT phone including the large lens member is that space for graphics on the external surface of the bezel is severely limited as generally the upper third or half of the phone is not available for receipt of graphics thereon. In addition, changing the acoustic pathway with the current phone design requires that the entire bezel be reconfigured as currently the recesses for the audio channeling are formed in the bezel itself. Finally, should the lens become loose or ajar in the current phone, audio quality can be significantly compromised as the lens is an integral part of the proper channeling of sound pressure to the user's ear.

Accordingly, there is a need for an electronic wireless communication device having maximized space on its front housing portion for receipt of graphics thereon. Further, an electronic wireless communication device is needed that allows for different sound pathways without requiring different bezel housing portions therefor. Finally, an electronic wireless communication device that maintains sound quality despite any loosening or separation of the lens member from the device would be desirable.

BRIEF DESCRIPTION OF THE DRAWINGS

FIG. 2 is a perspective view of the prior front, housing bezel portion showing recesses formed in the external surface thereof for forming audio channels for the device;

FIG. 4 is a perspective view of an audio cover member for being attached to an internal surface of the bezel housing portion showing recesses formed in the cover member for channeling sound to the external environment;

FIG. 5 is a rear fragmentary, perspective view of an upper portion of the bezel housing portion showing the internal surface thereof to which the audio cover member is attached;

FIG. 6 is a fragmentary, perspective view similar to FIG. 5 showing the audio cover member in position to be attached to the housing bezel portion;

DETAILED DESCRIPTION OF THE PREFERRED EMBODIMENTS

Figure 1:
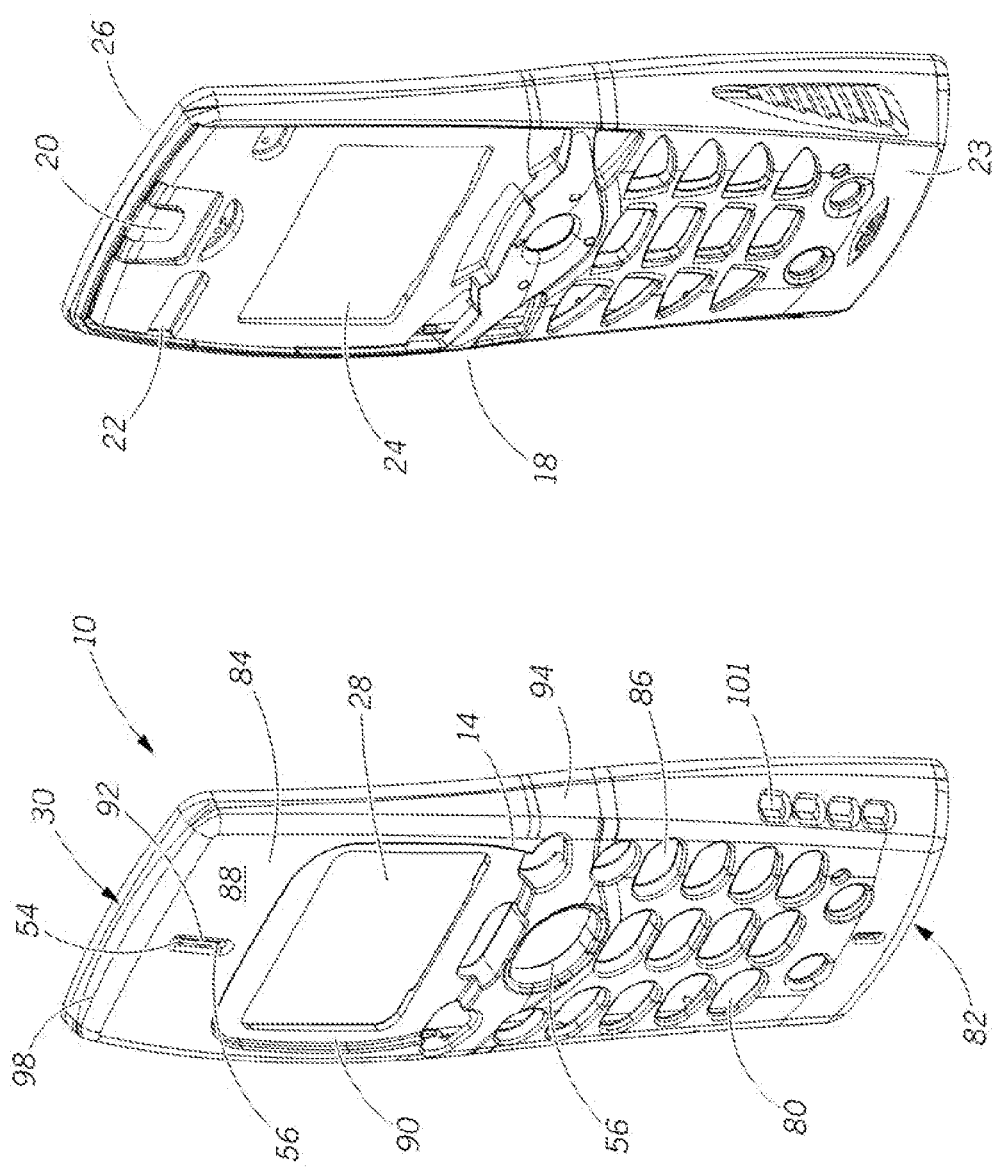
FIG. 1 is perspective view of a front, bezel housing portion for a wireless electronic communication device in accordance with the present invention showing an exterior surface of the housing portion that is substantially devoid of audio channeling recesses therein.

In accordance with the present invention, an electronic communication device is provided, e.g., PTT phone, having a housing portion in which a window opening is provided for a display screen of the device. The housing portion has opposite outer and inner surfaces, and there is at least one audio channel formed along the inner surface of the housing portion. Herein, the terms channel or channeling refer to directing or routing sound in a desired course or pathway. By leaving the outer or exterior surface of the housing portion substantially free of audio channels that run therealong, the area on the housing portion exterior surface can be maximized in size for receipt of graphics thereon, as will be discussed in more detail hereinafter. In addition, with the audio channeling formed along the internal surface of the bezel housing portion, the lens member which no longer cooperates to form the audio channeling can be minimized in size. In this regard, the lens member can be sized to be slightly larger than the window opening in the bezel for being mounted thereover. As the lens member is not significantly extended in size beyond that needed for covering the window opening, there is more uncovered space on the external surface of the bezel housing portion for receipt of graphics, as previously mentioned. Alternatively, the audio channeling can be provided along an internal surface in the housing although not necessarily on the housing portion or bezel member in which the display window is formed. Accordingly, it has been found that the present bezel housing portion is well suited for phones in which users wish to have customized graphics provided thereon due to the increased surface area for such graphics, as discussed above.

In one form, an audio cover member separate from the bezel housing portion is provided with the audio cover member being attached to the internal surface of the bezel housing portion to cooperate to form the audio channeling for the phone device. As an example, audio channels are formed as by recesses in the audio cover member so that the inner surface of the housing bezel portion acts to cover the channels with the audio cover member attached thereto. In this manner, the audio channeling for the device can be varied based on the audio channels provided on the audio cover member without requiring that the bezel housing portion be changed in its configuration, as required with the prior device.

In FIGS. 1 and 3-6 a front bezel member or housing portion 10 and an audio cover member 12 for an electronic communication device or phone are shown. The bezel member 10 has an external or outer surface 14 and an internal or inner surface 16, with audio channeling formed to extend along the inner surface 16 of the bezel housing portion 10 such as between the audio cover member 12 and the bezel inner surface 16. The audio channels are transverse to the typical fore and aft pathway for sound emanating from a speaker forwardly through speaker ports in the phone to a user's ear. With the internal audio channeling herein, maximum surface area is provided along the bezel outer surface 14 for receipt of graphical content or graphics, e.g. text and/or images, thereon. This is in contrast to the previously described prior bezel 18 shown in FIG. 2 which incorporates audio channels at recesses 20 and 22 formed in the outer surface 23 thereof. To form the audio channels with the prior bezel 18, the lens member has to be sized to cover these recesses 20 and 22 thus extending beyond window opening 24 in the bezel 18 and toward the upper end 26 thereof.

In contrast, with the audio channels formed to extend or run along an inner surface of the device and specifically along the bezel inner surface 16, it can be seen that the present bezel member 10 has a much greater surface area of its outer surface 14 on which graphical content can be received, particularly in the area above window opening 28 and toward upper end 30 thereof. To this end, lens member 32 (FIG. 7) can be sized to be only slightly larger than the window opening 28 as it plays no role in forming the internal audio channels for the present electronic communication device, in contrast to the lens for prior PTT phones, the bezel 18 of which is shown in FIG. 2. By way of example and not limitation, the present lens member 32 can be sized at less than approximately 1.5 inches in the lengthwise direction of the bezel member 10 as compared to prior lens member length of over 2 inches, representing an approximately 25 percent decrease in size in the lengthwise dimension for the lens member 32 herein. In addition, should the connection of the present lens member 32 to the phone become loose, ajar or otherwise compromised, the audio quality provided by the phone should not be affected.

Instead of forming audio channels with a relatively large lens and a recessed outer surface as in the prior bezel 18, the audio cover member 12 is adapted to be attached to the bezel inner surface 16 to cooperate to form the audio channeling therewith so that the audio channels run along the inner surface 16 of the bezel housing portion 10, as previously mentioned. More specifically, since the audio cover member 12 is an additional part, it is preferred that recesses 34 and 36 be provided therein with the substantially flat internal surface 16 of the bezel member 10 covering the recesses 34 and 36 to form the audio channeling for the phone. In this manner, should changes in the pathway or direction for the channeling be desired, an audio cover member 12 having differently configured audio channel recesses can be provided while keeping the configuration of the bezel member 10 substantially the same. In this way, the bezel member 10 can be universally used despite differences in audio channeling between phones.

Figure 3:
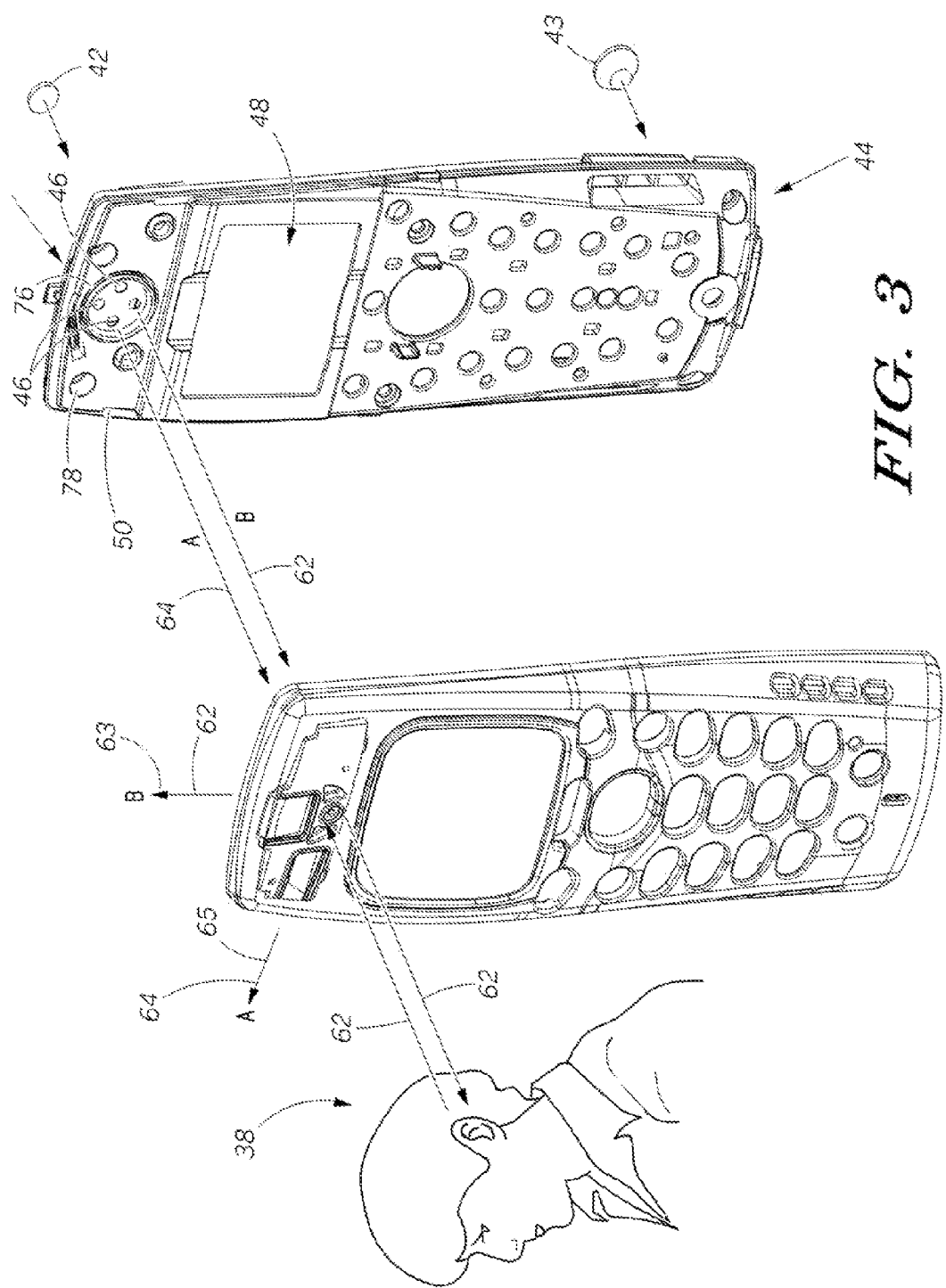
FIG. 3 is a perspective view of the housing bezel portion of FIG. 1 and a main body portion of the device including the transducer and showing the audio pathways of the device.
Figure 7:
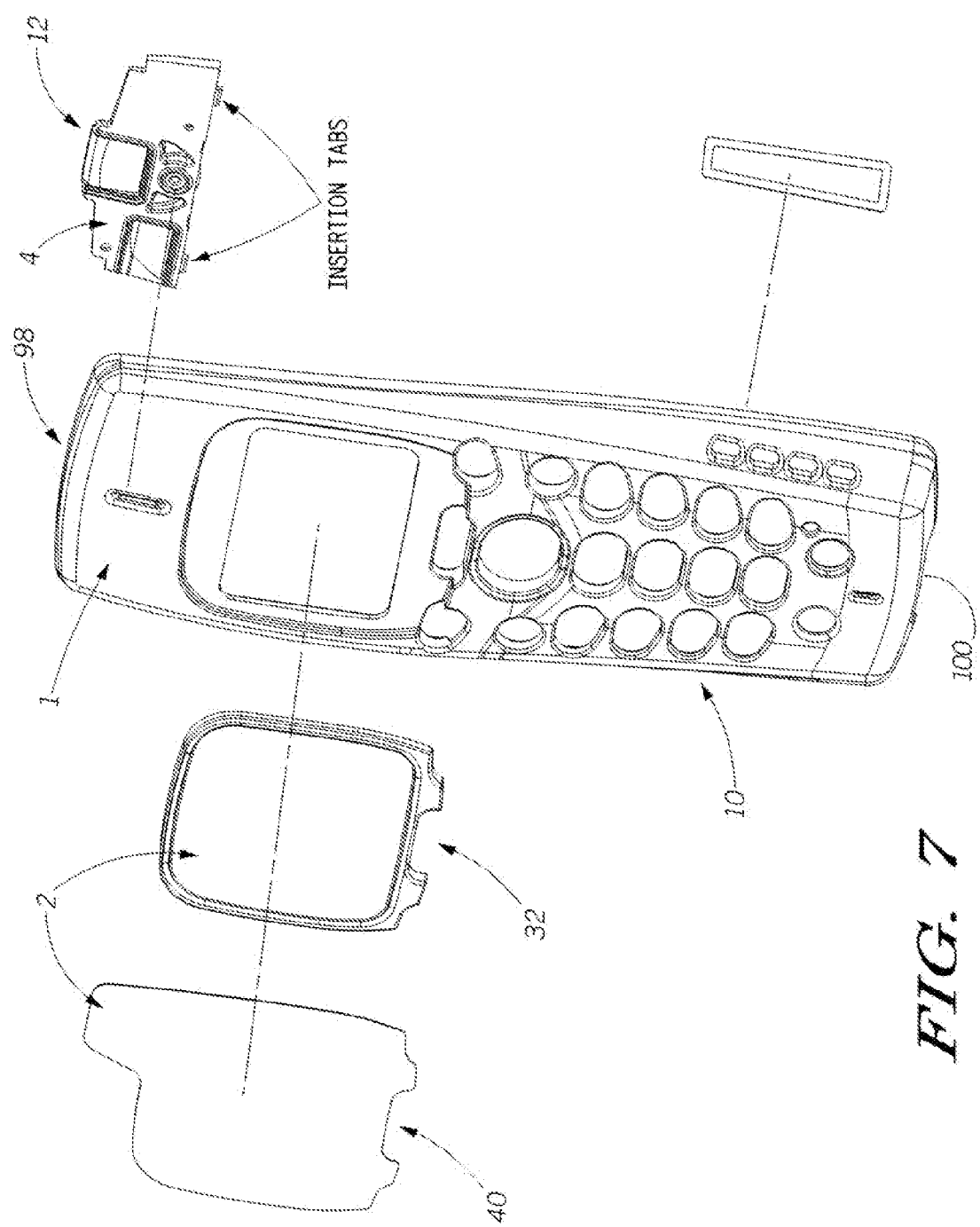
FIG. 7 is an exploded, perspective view showing the bezel housing portion and audio cover member along with the lens member and a protective cover sheet therefor.

Referring more specifically to FIGS. 3 and 7, a front bezel assembly 38 is provided including the bezel member 10 having the audio cover member 12 attached to its inner surface 16 and lens member 32 attached to its outer surface 14. A protective clear cover sheet or film 40 can also be attached over the lens member to minimize damage thereto as by scratching and the like. The front bezel assembly 38 is attached to the main body or brick of the wireless electronic communication device and cooperates with the rear housing member to substantially enclose the phone body including the RF communication circuitry (for enabling wireless communication with other such phones via audio signals received therefrom), the display screen and the speaker (for emitting sound based on the received audio signals) therein. In particular, the illustrated bezel assembly 38 is for a PTT telephone so that it includes the low audio speaker in the form of transducer 42 toward the upper end of the phone and a high audio speaker 43 (see FIG. 3) toward the lower end of the phone. A front portion 44 of the phone body is shown in FIG. 3 and the transducer 42 can be mounted at the back of the front body portion toward its upper end above window opening 48 for the phone display with the ports 46 generally aligned with the transducer 42 to allow sound emitted from the transducer to travel therethrough. An additional side aperture or port 50 is provided off to one side of the group of ports 46 that is specifically provided for allowing excessive sound to be released or leaked to the external environment, as will be described more fully hereinafter.

Figure 11:
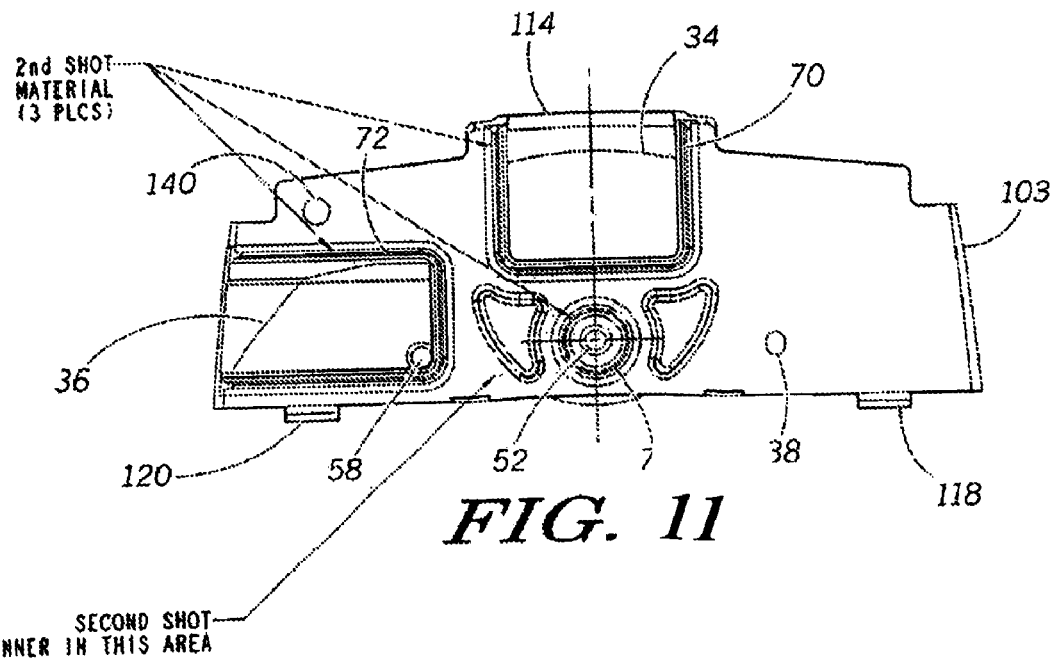
FIGS. 11-13 are various views of the audio cover member.

The audio cover member 12 includes a through aperture or port 52 below the recess 34. As best seen in FIGS. 4 and 11, the recess 34 and port 52 are located centrally on the audio cover member 12. The bezel member 10 has a pair of vertically aligned through apertures or ports 54 and 56 above the window opening 28 toward the upper end 30 thereof. As can be seen in FIG. 1, the ports 54 and 56 are also located centrally on the bezel member 10. With the audio cover member 12 secured in the bezel member 10, the through aperture 52 of the audio cover member 12 will be aligned with the lower through aperture 56 in the bezel member 10, which are both generally aligned with the transducer 42, and the recess 34 above the through aperture 52 be aligned with the upper through aperture 54 of the bezel member 10. The audio cover member 12 is also provided with a through aperture or port 58 that opens to the audio channel recess 36, as best seen in FIG. 11.

Accordingly, with front bezel assembly 38 secured to the main body of the phone, the audio pathways between the transducer 42 and a user's ear positioned adjacent the external surface 14 of the bezel member 10 and the external environment about the phone will be as depicted in FIG. 3. Thus, sound emanating from the transducer 42 will pass through throughports 46 in the front body portion 44, through throughport 52 in the audio cover member 12, and through throughport 56 in the bezel member 10 out from the phone device to the user's ear. Sound pressure is properly regulated by permitting air to travel back into the phone via the upper throughport 54 in the bezel member 10 into the audio channel formed by recess 34 of the audio cover member 12 and it is then routed past unsealed end portion 60 thereof upwardly and out of the phone housing to the external environment. This pathway is indicated by arrows designated with reference number 62.

To provide for further sound pressure leakage to the external environment, the bezel assembly 38 provides an additional sound pressure pathway indicated by arrows designated with reference number 64. In pathway 64, sound pressure emitted from the transducer 42 travels through throughport 50 in the front body portion 44, and through throughport 58 formed in the audio cover member 12 into audio channel recess 36 thereof. The sound pressure in audio channel 36 is then routed laterally out of the unsealed end portion 66 into the external environment about the phone. Accordingly, the preferred audio channeling herein provides two distinct pathways 62 and 64 for regulating excessive sound pressure from the transducer 42 with respective outgoing channel sections 63 and 65 of the pathways 62 and 64 out of the phone being transverse, and preferably directed substantially perpendicularly to each other, as depicted in FIGS. 3 and 4. Also, these sections 63 and 65 are transverse to the remaining fore and aft sections of the pathways 62 and 64.

Turning to more of the details, the recesses 34 and 36 can have a generally rectangular configuration as formed on the forwardly facing surface 68 of the audio cover member 12. The recesses 34 and 36 are provided with respective seals 70 and 72. With the audio cover member 12 secured to the bezel inner surface 16, the seals 70 and 72 can resiliently engage against the bezel inner surface 16 to minimize air leakage therebetween. As shown, the seals 70 and 72 can have a substantially U-shaped configuration so as to extend along three sides of the respective rectangular audio channel recesses 34 and 36. As can be seen in FIGS. 4 and 11, the U-shaped seal 70 leaves the upper side 60 of the recess 34 unsealed to provide the air passageway 62 with an upward release direction from the phone. The U-shaped seal 72 leaves the recess side 66 open to allow for release of sound therefrom in a lateral direction and to the exterior environment around the phone.

Figure 14:
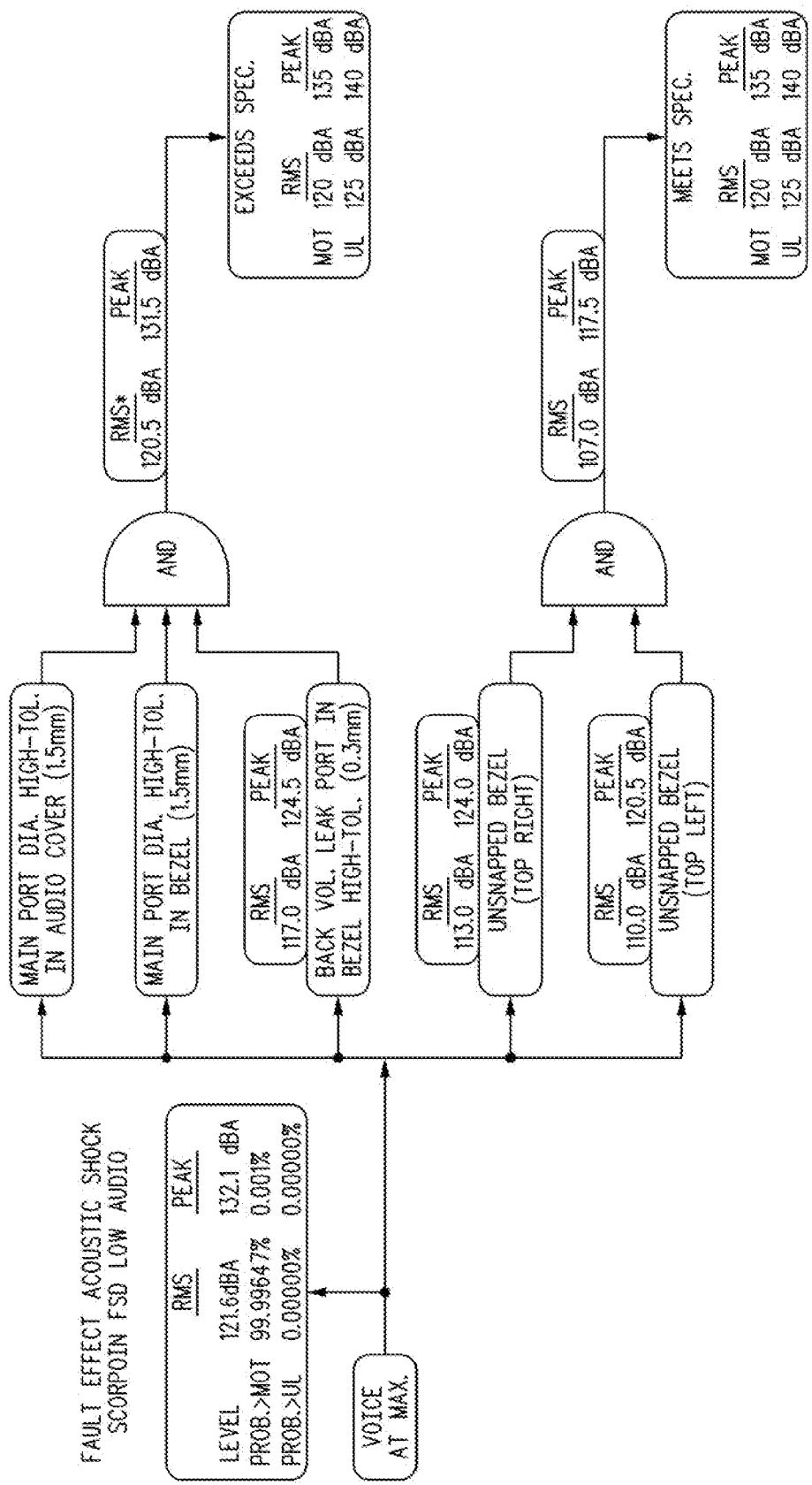
FIG. 14 is a diagram showing the performance of the present bezel and audio cover member assembly as compared to maximum audio level specifications therefor.

FIG. 14 depicts test results obtained employing the present audio cover member 12 including the audio channel recesses 34 and 36 for forming the audio pathways 62 and 64 that regulate sound pressure from the transducer 42. As can be seen, in each instance the bezel assembly 38 meets industry specifications from Underwriters Laboratories (UL), and meets the applicants' assignees (MOT) specifications, except in one instance with respect to the root means square (RMS) of the audio level tests. Even so, since the MOT specification is more stringent than the industry UL specification, the performance of the bezel assembly 38 is still satisfactory, especially since it only exceeds the MOT specification by 0.5 decibels (dBA).

The bezel assembly 38 can be formed of molded components including the bezel member 10 and the audio cover member 12. To this end, the bezel member 10 and the audio cover member 12 (less seals 70 and 72) can be of plastic material. The audio cover member 12 can be a two-shot component with the seals 70 and 72 formed of an elastomeric material, e.g. monprene. An additional annular seal 74 is fixed about the throughport 52 for forming audio pathway 62 as seated against the bezel inner surface 16. In addition, the main body portion 44 includes seals 76 and 78, as can be seen in FIG. 3. Seal 76 has an annular configuration having a relatively large diameter for surrounding the four through apertures 46 equally spaced as by ninety degree increments therebetween. The seal 78 has a much smaller diameter and has a cylindrical configuration extending about through aperture 50 of the main body portion 44. The seals 76 and 78 can be of a flexible, elastomeric material and both resiliently seat against the back surface 80 of the audio cover member 12 when bezel assembly 38 and main body portion 44 are assembled together. Accordingly, the seal 76 is effective to direct sound transmitted from transducer 42 and coming through the apertures 46 in pathway 62 through the audio member through aperture 52. Seal 78 is effective to direct sound emitted from transducer 42 and passing through through aperture 50 along sound pathway 64 through the through aperture 58 in the audio cover member 12.

In the preferred and illustrated form as can be seen in FIG. 1, the bezel member 10 has an elongate construction having a length extending from the upper end 30 down to a lower end 82 thereof. The bezel member 10 herein is well adapted to receive graphics on both sides of the widow opening 28, that is above and below the opening 28, and thus for substantially the full length of the bezel member 10 due to the internal audio channeling, as has been described earlier. More specifically, the bezel member 10 has a forward face 84 in which the window opening 28 is formed along with through openings 86 therebelow for keys of the key pad of the phone to project therethrough. As previously discussed, the area 88 of the front surface 84 above the window opening 28 is substantially devoid of audio channeling, and is not covered by the lens member 32. Instead, the lens member 32 is seated in stepdown recess 90 provided in the front surface 84 extending about the window opening 28 below the upper surface area 88 with at least the portion of the lens member 32 extending over the opening 28 being transparent for viewing of the display therebelow. The through apertures 54 and 56 formed in the surface portion 88 are disposed in a short vertical groove 92 which is not covered by lens member 32 and is not intended to form part of the pathway 62 for regulating and/or releasing excessive sound from the transducer 42 to the ambient environment about the phone. Accordingly, this entire area 88, which by way of example can be approximately ¾ of an inch sized along the lengthwise extent of the bezel member 10, is amenable to receipt of graphical content thereon as opposed to the corresponding area on the prior bezel member 18 having the complexly contoured surface thereof due to the audio channel recesses 20 and 22 formed therein.

Figure 12:
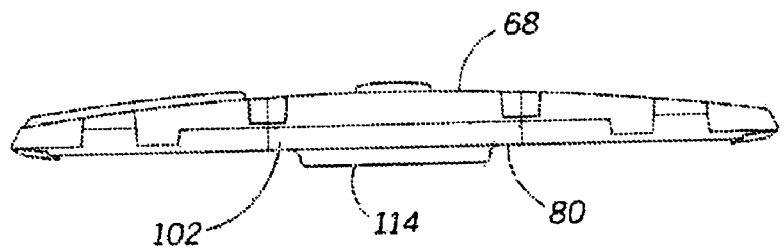
Figure 13:
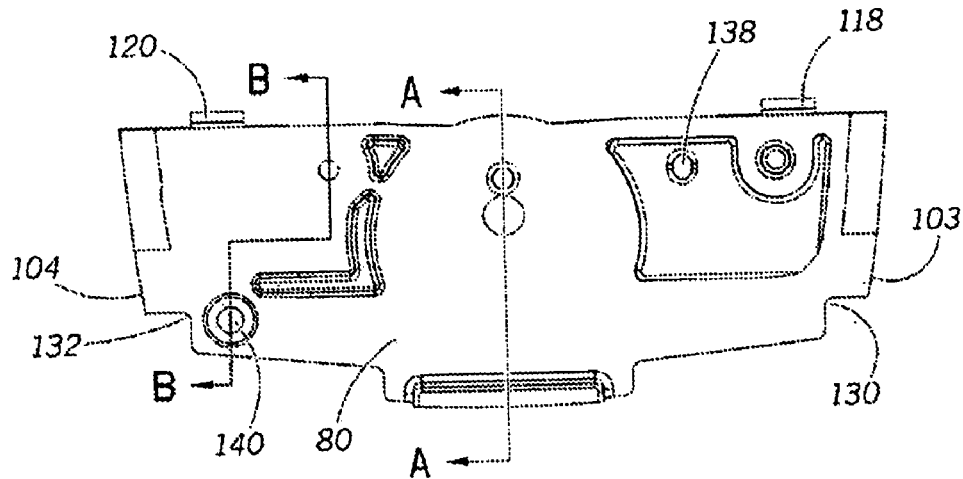

The bezel member 10 includes peripheral elongate opposite side wall portions 94 and 96, and opposite end wall portions 98 and 100. The sidewall portions 94 and 96 define the lateral or widthwise extent of the bezel member 10. For a PTT phone, the illustrated bezel sidewall portion 94 includes several vertically aligned openings 101 for sound emanating from the high audio speaker. Referring to FIGS. 11-13, the audio cover member 12 has a body 102 including opposite sides 103 and 104 between which the central recess 34 and port 52 are centered and which are spaced by a distance that is slightly less than that between the corresponding sidewall portions 94 and 96 of the bezel member 10. In this way, with the audio cover member 12 assembled to the bezel member 10, there is a slight gap between the bezel sidewalls 94 and 96 and audio cover member sides 103 and 104, as can be seen best in FIG. 8. In particular, the gap 106 between audio member side 104 and sidewall portion 96 allows for sound channeled out from the recess 36 to escape from between the audio cover member 12 and the bezel member 10 and out to the external environment about the phone.

Figure 8:
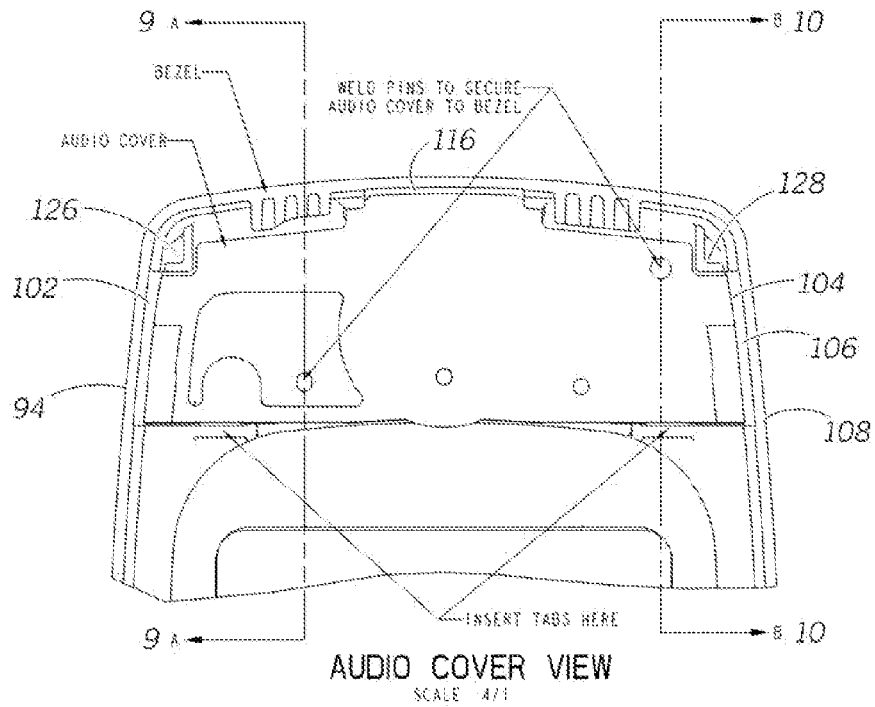
FIG. 8 is a fragmentary, elevation view of the upper portion of the bezel housing portion showing the audio cover member attached thereto.

To mount and secure the audio cover member 12 to the bezel member 10, several mounting flanges are provided on the internal surface 16 of the bezel member 10. The body 102 of the audio cover member 12 includes a laterally extending bottom 108 that seats against flanges 110 and 112 upstanding from the bezel inner surface 16, as seen best in FIGS. 5, 6 and 8. Referring to FIGS. 4 and 11, spaced from the bottom 108, the audio cover member body 102 includes an upper side 113 having an uppermost, upturned flange portion 114 extending therefrom at the unsealed upper end 60 of the recess 34. The flange portion 114 is spaced from the bezel upper end wall portion 98 with the audio cover member bottom 108 abutted against flanges 110 and 112 therefor. Thus, there is a gap 116 formed between the bezel end wall portion 98 and the audio cover member flange portion 114, as shown in FIG. 8. The upturned flange 114 can also extend inwardly as shown so that sound directed out from the audio cover member recess 34 has a larger gap opening 116 for escaping upwardly and out from the phone in pathway 62, as previously described.

At the bottom 108 of the audio cover member body 102, a pair of laterally spaced projections 118 and 120 are formed. The bezel mounting flanges 110 and 112 have slot openings 122 and 124, respectively, therein, and the projections 118 and 120 are located and sized to fit into the corresponding slot openings 122 and 124. Specifically, for attaching the audio cover member 12 to the bezel member 10, a camming engagement is provided between the projections 118 and 120 and the slot openings 122 and 124. Initially, the projections 118 and 120 are located in the corresponding slot openings 122 and 124 with the upper side 113 of the audio cover member body 102 spaced from the bezel member internal surface 16. The audio cover member 12 is then pivoted about the engaged projections 118 and 120 and slot openings 122 and 124 down toward the bezel inner surface 16 so that they cam against each other and snap the audio cover member 12 into place in the bezel member 10. With the audio cover member 12 snap fit in the bezel member 10, upper locating flanges 126 and 128 of the bezel member 10 mate in correspondingly configured notches 130 and 132 formed at the upper corners of the audio cover member 12, as best seen in FIG. 8. As illustrated, the flanges 126 and 128 and notches 130 and 132 each can have a right angle configuration for this purpose.

Figures 9, 10:
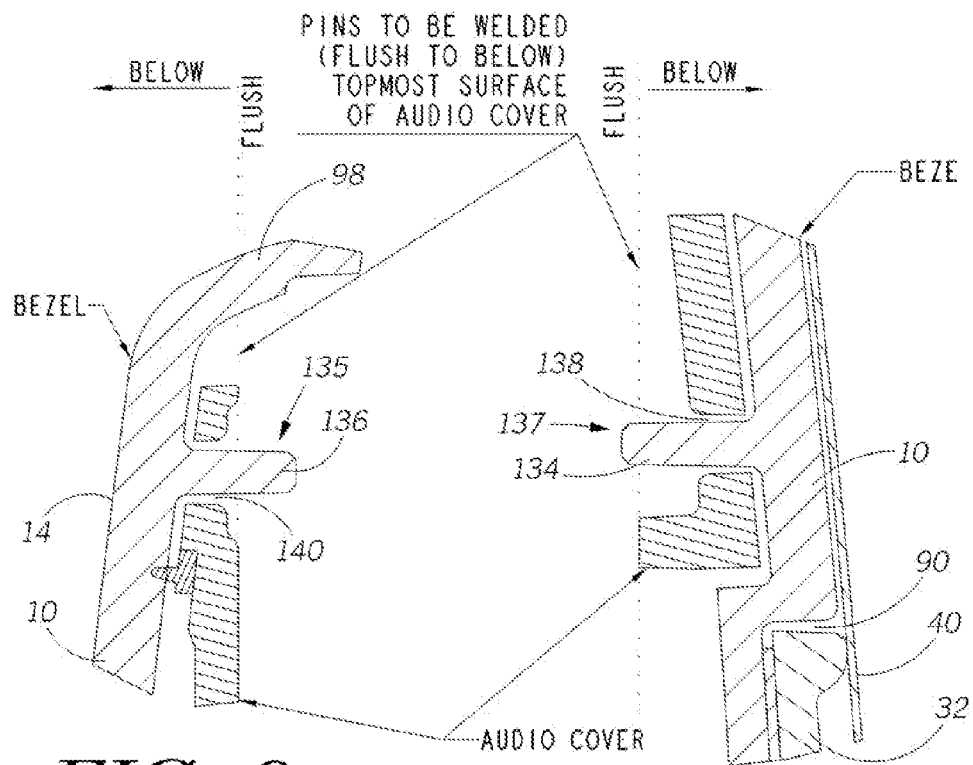
FIG. 9 is a fragmentary cross-sectional view taken along line 9-9 of FIG. 8 showing the audio cover member assembled to the bezel portion.
FIG. 10 is a fragmentary cross-sectional view taken along line 10-10 of FIG. 8 showing the audio cover member assembled to the bezel housing portion.

To provide a more permanent connection between the bezel member 10 and audio cover member 12, they can be staked together. To this end, the bezel member inner surface 16 can include heat stake members 135, 137 in the form of a pair of weld pins 134 and 136 which fit through corresponding apertures 138 and 140 in the audio cover member 12 with the audio cover member body 102 snapped in place in the bezel member 10, as shown in FIGS. 9 and 10. The projecting ends of the pins 136 and 138 can then be heat staked to substantially permanently affix the audio cover member 12 in the bezel member 10.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

We claim:

1. An electronic communication device, comprising:
   a housing portion for the device including a window opening for a display screen;
   opposite outer and inner surfaces of the housing portion, wherein the outer surface includes a plurality of through openings for receipt of keys of a keypad for the device projecting therethrough;
   at least one audio channel formed along the inner surface of the housing portion allowing the outer surface to be maximized in size for receipt of graphics thereon; and
   low and high audio speakers;
   wherein the audio channel is a sound pressure pathway that exits a top or side of the electronic communication device, wherein the top or side of the electronic communication device are substantially perpendicular to the outer surface that includes the plurality of through openings and wherein the audio channel is associated with the low audio speaker.

2. The device of claim 1 wherein the outer surface includes surface portions on opposite sides of the window on which graphics can be received.

3. The device of claim 1 including a lens member sized to be slightly larger than the window to be mounted thereover.

4. The device of claim 3 wherein the lens member is mounted to the housing portion along the outer surface thereof so that the audio channel is formed independent of the lens member.

5. The device of claim 1 wherein the at least one audio channel comprises multiple audio channels, and
   an audio cover member mounted to the inner surface of the housing portion and cooperating therewith to form the audio channels.

6. The device of claim 5 wherein the audio cover member includes recesses formed therein for the audio channels.

7. The device of claim 5 wherein the housing portion and audio cover member include snap fit structure therebetween for cooperating to secure the audio cover member to the housing portion.

8. The device of claim 5 wherein the housing portion or the audio cover member include heat stake members for welding the audio cover member to the housing portion.

9. The device of claim 1 wherein the low audio speaker comprises a transducer, and the housing portion includes a small through aperture adjacent the window opening generally aligned with the transducer.

10. The device of claim 1 wherein the housing portion comprises a first housing portion, and
    a second housing portion for being connected to the first housing portion to form an internal space of the device in which the audio channel is formed.

11. An electronic communication device comprising:
    a housing for containing communication circuitry and having an external surface and an internal surface, wherein the external surface includes a plurality of through openings for receipt of keys of a keypad for the device projecting therethrough;
    a window opening in the housing;
    a display screen aligned with the window opening and connected to the circuitry to display information for viewing by a user;
    a speaker in the housing connected to the circuitry for emitting sound based on audio signals from another communication device;
    at least one audio channel for routing sound from the speaker in a predetermined pathway wherein the audio channel is a sound pressure pathway that exits a top or a side of the electronic communication device, wherein the top or side of the electronic communication device are substantially perpendicular to the external surface;
    a lens member of transparent material having predetermined dimensions that are kept to a minimum to be slightly larger than that of the window opening for being fixed to the housing external surface about the window opening covering the display screen and maximizing surface area on the housing external surface for receipt of graphics; and
    a high audio speaker in the housing connected to the circuitry for emitting sound based on audio signals from another communication device.

12. The electronic communication device of claim 11 wherein the audio channel is formed in the housing along one of the internal surfaces thereof leaving the housing external surface substantially free of audio channels.

13. The electronic communication device of claim 11 wherein the lens member is independent of the audio channel so that integrity of connection of the lens member to the housing does not affect audio quality from the speaker to the user.

14. The electronic communication device of claim 13 wherein the audio channel is in the housing extending along one of the internal surfaces thereof.

15. The electronic communication device of claim 11 including an audio cover member for being connected in the housing cooperating to form the audio channel in the housing.

16. The electronic communication device of claim 15 wherein the audio cover member includes a recess that cooperates with one of the housing internal surfaces to form the audio channel.

17. An electronic communication device comprising:
a bezel housing portion for the device including a window opening for a display screen;
external and internal surfaces of the bezel housing portion, wherein the external surface includes the window opening for the display screen; and
an audio cover member having audio channels for being attached to the internal surface of the bezel housing portion to keep the external surface substantially free of audio channels and to allow the bezel housing portion to stay substantially the same and have different audio channeling based on the audio channels included on the cover member attached thereto, wherein one of the audio channels exits a top of the electronic communication device and the other audio channel exits a side of the electronic communication device, wherein the top or side of the electronic communication device are substantially perpendicular to the external surface that includes the window opening; and
low and high audio speakers, wherein the audio channels are associated with the low audio speaker.

18. The electronic communication device of claim 17 including a lens member having a predetermined size that is kept to a minimum to fit over the window opening for covering the display screen.

19. The electronic communication device of claim 17 including a lens member fixed to the external surface of the bezel housing portion to cover the display screen with the audio channels formed independent of the lens member.

20. The electronic communication device of claim 17 wherein the bezel housing portion includes a through aperture generally aligned with the low audio speaker, the audio cover member includes a through port for being aligned between the low audio speaker and housing portion through aperture, and the channels include recesses formed in the audio cover member for releasing excessive sound pressure.

21. The electronic communication device of claim 20 wherein the audio cover member includes seals extending about the port and recesses with portions of the recesses unsealed for sound pressure release therefrom.

* * * * *